(12) United States Patent
Boudreault

(10) Patent No.: US 11,617,983 B2
(45) Date of Patent: Apr. 4, 2023

(54) METHODS AND APPARATUSES FOR HARVESTING WATER FROM AIR

(71) Applicant: AWN NANOTECH INC., Saint-Laurent (CA)

(72) Inventor: Richard Boudreault, Saint-Laurent (CA)

(73) Assignee: AWN NANOTECH INC., Saint-Laurent (CA)

( * ) Notice: Subject to any disclaimer, the term of this patent is extended or adjusted under 35 U.S.C. 154(b) by 363 days.

(21) Appl. No.: 16/763,227

(22) PCT Filed: Nov. 13, 2018

(86) PCT No.: PCT/CA2018/051432
§ 371 (c)(1),
(2) Date: May 12, 2020

(87) PCT Pub. No.: WO2019/070437
PCT Pub. Date: May 16, 2019

(65) Prior Publication Data
US 2020/0298174 A1   Sep. 24, 2020

Related U.S. Application Data

(60) Provisional application No. 62/585,348, filed on Nov. 13, 2017.

(51) Int. Cl.
*B01D 53/02* (2006.01)
*B01D 53/26* (2006.01)
*E03B 3/28* (2006.01)

(52) U.S. Cl.
CPC ............. *B01D 53/26* (2013.01); *B01D 53/02* (2013.01); *B01D 53/261* (2013.01); *E03B 3/28* (2013.01); *B01D 2253/102* (2013.01)

(58) Field of Classification Search
CPC ...... B01D 53/26; B01D 53/261; B01D 53/28; B01D 53/04; B01D 2253/102; E03B 3/28; Y02A 20/00
(Continued)

(56) References Cited

U.S. PATENT DOCUMENTS 4,391,616 A   7/1983   Imamura
5,643,457 A *  7/1997   Abramov ............... B64G 1/46
                                                  210/668

(Continued)

FOREIGN PATENT DOCUMENTS

KR        101492823        2/2015

OTHER PUBLICATIONS

Do et al., "A model for water adsorption in activated carbon", Carbon 38 (2000) 767-773. (The year of publication is sufficiently earlier than the effective U.S. filing date so that the particular month of publication is not an issue.).

(Continued)

*Primary Examiner* — Frank M Lawrence, Jr.
(74) *Attorney, Agent, or Firm* — Bereskin & Parr LLP/S.E.N.C.R.L., s.r.l.

(57) ABSTRACT

Examples of apparatuses for harvesting water are described herein. The apparatuses include a wall having a hydrophilic contacting surface and a hydrophobic collecting surface. A plurality of pores defining an inner volume extend between the contacting surface and the collecting surface and provide a fluid flow communication between the contacting surface and the collecting surface. As air is directed across or towards the wall, water condenses on the contacting surface, seeps into the pores and passes through the wall to the collecting surface for collection.

18 Claims, 13 Drawing Sheets

(58) Field of Classification Search
USPC ......... 96/108, 152, 154; 95/117; 34/73, 472, 34/473, 80
See application file for complete search history.

(56) References Cited

U.S. PATENT DOCUMENTS

| | | | |
|---|---|---|---|
| 6,960,243 B1 | 11/2005 | Smith et al. | |
| 8,511,072 B2 * | 8/2013 | Judkins | B01D 53/002 95/52 |
| 9,394,672 B2 * | 7/2016 | Judkins | B01D 53/002 |
| 2002/0139127 A1 * | 10/2002 | Kesten | F24F 3/147 62/93 |
| 2013/0319250 A1 * | 12/2013 | Becze | F25B 17/02 96/242 |
| 2014/0150651 A1 | 6/2014 | Velasco Valcke | |
| 2015/0251225 A1 | 9/2015 | Jagannathan et al. | |
| 2017/0072369 A1 | 3/2017 | Mitra et al. | |

OTHER PUBLICATIONS

Do et al., "A new adsorption-desorption model for water adsorption in activated carbon", Carbon 47 (2009) 1466-1473. (The year of publication is sufficiently earlier than the effective U.S. filing date so that the particular month of publication is not an issue.).

Furmaniak et al., "Water adsorption on carbons—Critical review of the popular analytical approaches", Advances in Colloid and Interface Science 137 (2008) 82-143. (The year of publication is sufficiently earlier than the effective U.S. filing date so that the particular month of publication is not an issue.).

Huber et al., "Monolithic nitrogen-doped carbon as a water sorbent for high-performance adsorption cooling", RSC Adv., 2016, 6, 25267. (The year of publication is sufficiently earlier than the effective U.S. filing date so that the particular month of publication is not an issue.).

Neitsch et al., "Water vapor adsorption by activated carbon: a modification to the isotherm model of Do and Do", Letters to the editor, Carbon 39 (2001) 1437-1438. (The year of publication is sufficiently earlier than the effective U.S. filing date so that the particular month of publication is not an issue.).

Abstract of Huber et al., "Water sorption behavior of physically and chemically activated monolithic nitrogen doped carbon for adsorption cooling", RSC Adv., Aug. 19, 2016, 6, 80729-80738.

Abstract of Huber et al., "The effect of activation time on water sorption behavior of nitrogen-doped, physically activated, monolithic carbon for adsorption cooling", Microporous and Mesoporous Materials, vol. 276, Mar. 1, 2019, pp. 239-250.

English Translation—Machine Translation of KR101492823B1, "Water Harvester Having Micro-Line Pattern", published on Feb. 23, 2015.

Cao et al., "Hydrophobic/Hydrophilic Cooperative Janus System for Enhancement of Fog Collection", Small 2015, 11, No. 34, 4379-4384. (The year of publication is sufficiently earlier than the effective U.S. filing date so that the particular month of publication is not an issue).

* cited by examiner

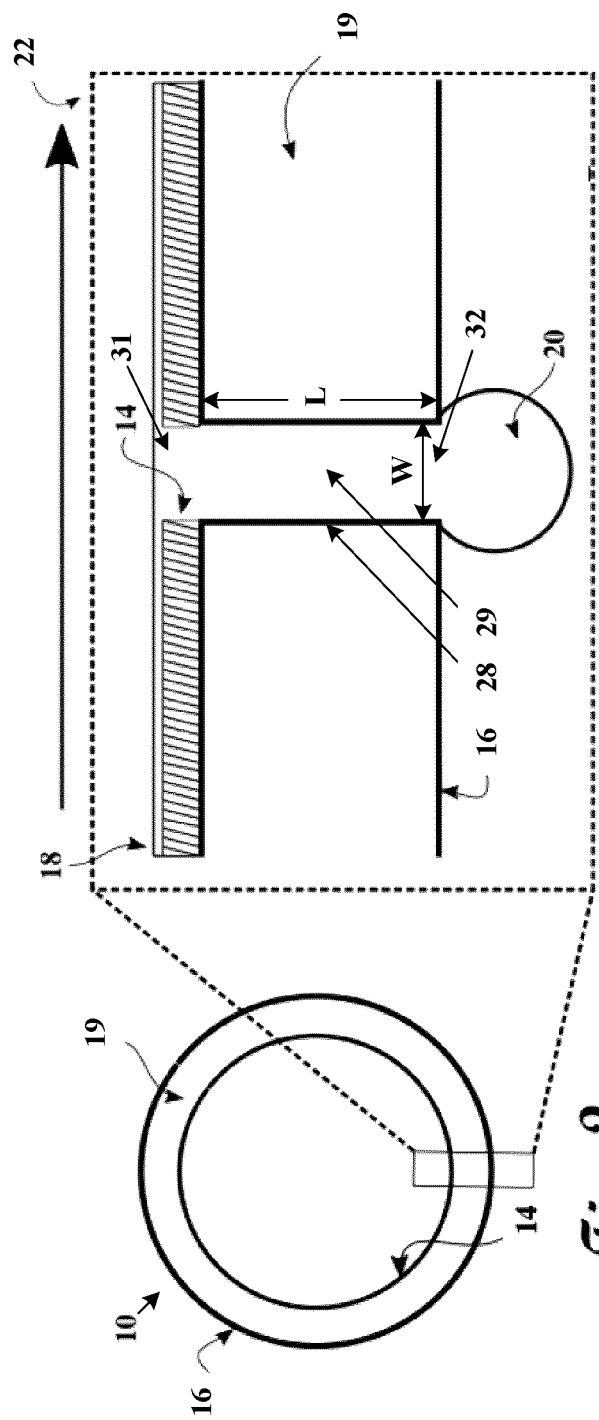

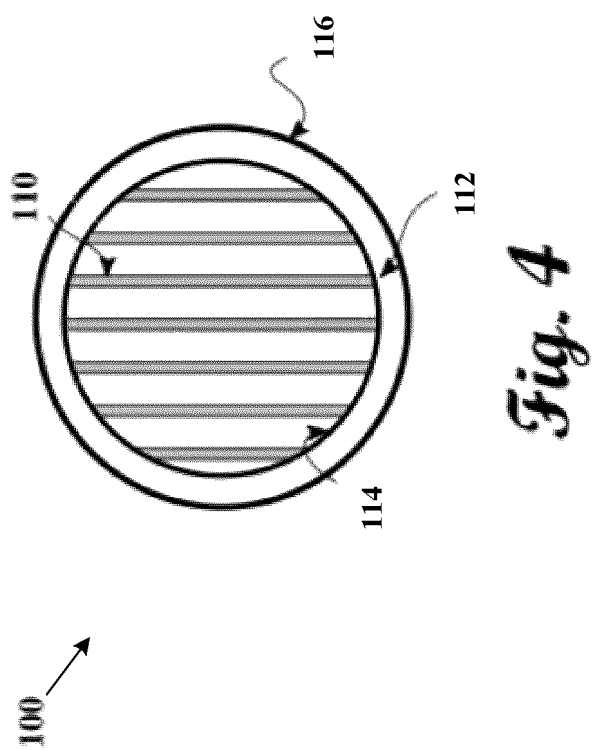

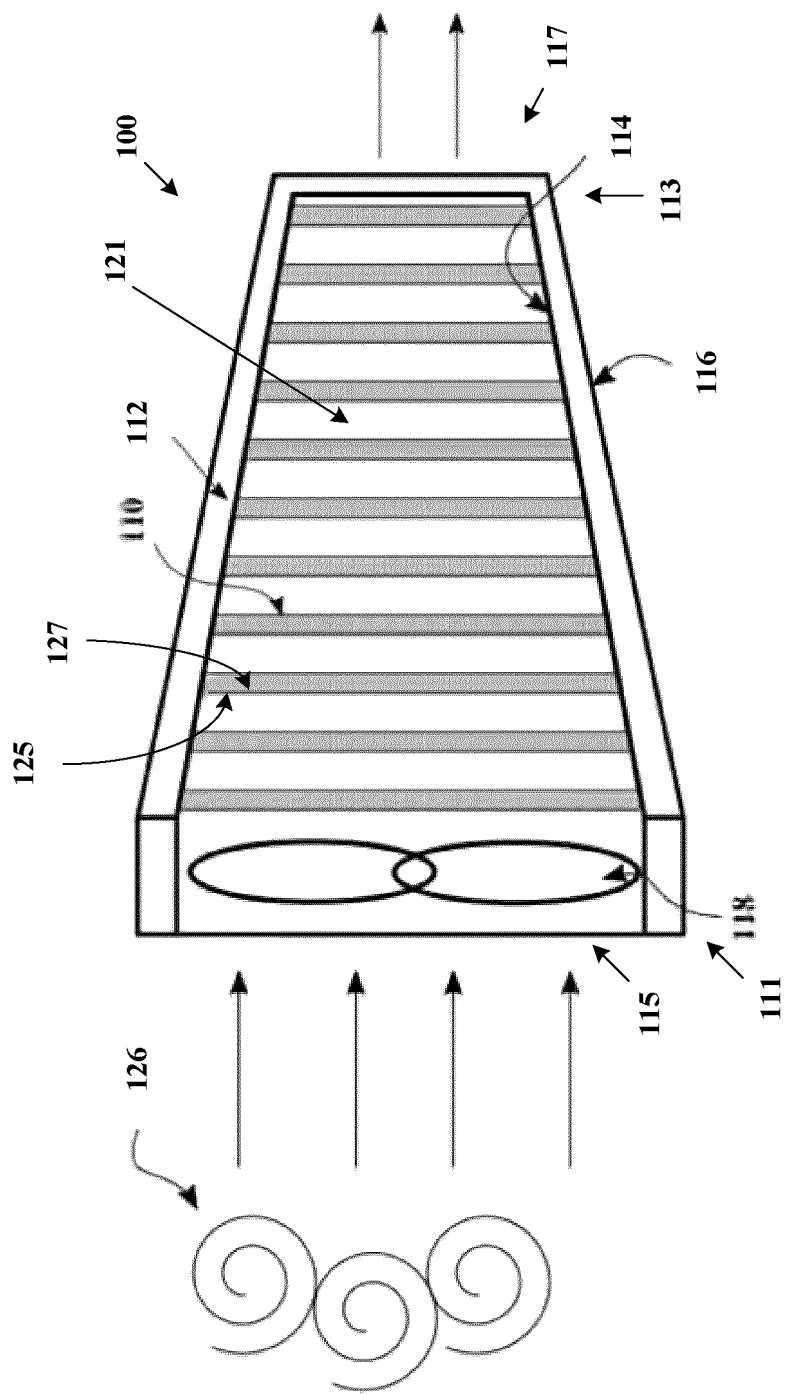

METHODS AND APPARATUSES FOR HARVESTING WATER FROM AIR

CROSS-REFERENCE TO RELATED APPLICATIONS

The present application is a 35 USC 371 national stage entry of PCT/CA2018/051432 filed on Nov. 13, 2018 and which claims priority to U.S. application No. 62/585,348 filed on Nov. 13, 2017. These documents are hereby incorporated by reference in their entirety.

TECHNICAL FIELD

The embodiments disclosed herein relate to water harvesting, and, in particular to apparatuses for harvesting water from air or other fluids containing water.

BACKGROUND

The atmosphere contains a significant amount of water in the form of humidity, aerosols and condensed droplets. According to some estimates, there is roughly 13,000 km$^3$ of freshwater present in the atmosphere in vapor, liquid droplets and solid (snow or ice) forms (Safford, 2007). Although not readily available, atmospheric water can be extracted and purified into potable water for consumption by humans, animals and/or plants and processes.

As the atmospheric temperature rises, increasing amounts of water will be absorbed in the air and a disruption of natural water cycles can be expected. This disruption will displace the amounts and locations of available freshwater across the globe (Frankel, 2015) and greatly impact peoples' access to clean, freshwater. In fact, some estimates are that currently 1.2 billion people, approximately $\frac{1}{5}^{th}$ of the world's population, are affected by water scarcity. This number is anticipated to grow over the coming years (Warren, 2016). Climate Change will further increase the equitable distribution of water.

Common processes for the intensive production of freshwater include membrane separations such as reverse osmosis (RO), which has become more cost effective in the past decade with a stabilized cost of US $0.5 per m$^3$ of water (Greenlee, Lawler, Freeman, Marrot, & Moulin, 2009). However, RO requires large bodies of saline water. For inland or noncoastal regions, RO is not feasible due to high capital investment and operational costs needed to install an RO unit and to pump water over a long distance (Greenlee, Lawler, Freeman, Marrot, & Moulin, 2009).

Atmospheric water generators (AWG) may offer a solution to current and anticipated water scarcity issues. AWGs can harvest water from air, allowing and regions with low rainfall or unsustainable groundwater to gain access to fresh water. Typical AWG approaches use variations on thermodynamic cycle processes to condense, clean and collect water from air humidity. These methods, although technically feasible, are not energy efficient. In fact, in comparison to RO desalination, current AWGs typically require twice the energy per unit mass of clean water (Peters, Blackburn, & Armedion, 2013).

Another principle that has been investigated involves forcing air through a desiccant material, which condenses the available water and collects the droplets by draining. Limitations for these technologies include the necessity for a low-cost and effective desiccant material, high energy cost and the slow water recovery process as these technologies rely solely on gravitational force for collection of water and other fluids.

Accordingly, there is a need for new apparatuses for harvesting water from air or other fluids containing water.

SUMMARY

According to some embodiments an apparatus for harvesting water from air is provided. The apparatus includes a body including a first end and a second end, the first end spaced apart from the second end, the first end having a first opening to receive air from atmosphere, or another fluid, comprising water and the second end having a second opening to release air from the body. A wall of the body extends from the first end to the second end and includes an internal hydrophilic contacting surface and an external hydrophobic collecting surface. The wall also includes a plurality of pores defining an inner volume between the contacting surface and the collecting surface providing for a fluid flow communication between the contacting surface and the collecting surface.

According to some embodiments, an apparatus for harvesting water from air is provided. The apparatus includes a wall comprising an internal hydrophilic contacting surface and an external hydrophobic collecting surface, the wall including a plurality of pores defining an inner volume between the contacting surface and the collecting surface and allowing a fluid flow communication between the contacting surface and the collecting surface.

According to some embodiments, an apparatus for harvesting water from air is provided. The apparatus includes a body comprising a plurality of alternating hydrophilic contacting surfaces and hydrophobic collecting surfaces, the surfaces defining therebetween an inner volume and allowing a fluid flow communication from a first end of the body to a second end of the body.

According to some embodiments, an apparatus for harvesting water from air is provided. The apparatus includes a body including a first end and a second end, the first end spaced apart from the second end, the first end having a first opening to receive air from atmosphere and the second end having a second opening to release air from the body. The apparatus also includes a wall of the body extending from the first end to the second end and including a plurality of tubes having an external hydrophilic contacting surface and an internal hydrophobic collecting surface, the tubes being substantially normal to a general direction of air displaced within the body.

According to some embodiments, an apparatus for harvesting water from air is provided. The apparatus includes a body comprising: a first end and a second end, the first end spaced apart from the second end, the first end having a first opening to receive air from atmosphere, or another fluid, comprising water and a second opening to release the air from the body, the second end having a third opening to release the water from the body; and a wall of the body extending between the first end and the second end and comprising an internal hydrophilic contacting surface and an external hydrophobic collecting surface, the wall comprising a plurality of pores defining an inner volume between the contacting surface and the collecting surface and allowing a fluid flow communication between the contacting surface and the collecting surface.

According to some embodiments, a method of harvesting water from air is provided. The method includes contacting air with a hydrophilic contacting surface of a wall of a water harvesting apparatus; forcing passage of the water comprised within the air into a pore disposed between the hydrophilic contacting surface and a hydrophobic collecting surface; and collecting the water from the pore at the hydrophobic collecting surface.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles and apparatuses of the present specification. In the drawings:

FIG. 2 is an end view of the water harvesting device of FIG. 1;

FIG. 3 is a magnified end view of a portion of the water harvesting device of FIG. 1;

FIG. 4 is an end view of a water harvesting device, according to another embodiment;

FIG. 5 is a cross-section view of the water harvesting device of FIG. 4;

DETAILED DESCRIPTION

Figure 1:
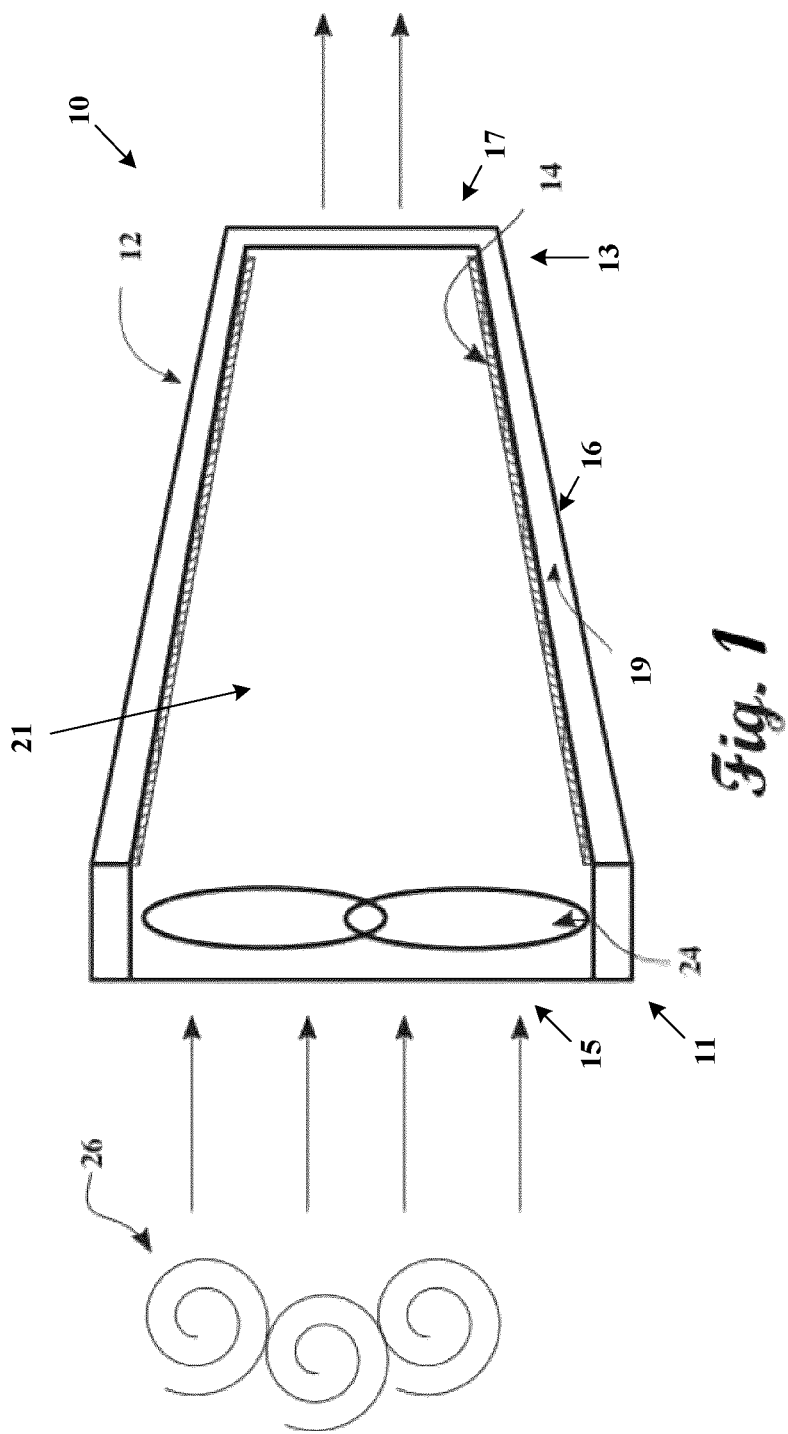
FIG. 1 is a cross-section view of a water harvesting device, according to one embodiment.

Various apparatuses will be described below to provide an example of each claimed embodiment. No embodiment described below limits any claimed embodiment and any claimed embodiment may cover apparatuses that differ from those described below. The claimed embodiments are not limited to apparatuses having all of the features of any one apparatus described below or to features common to multiple or all of the apparatuses described below.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

According to some embodiments, the pores are shaped to carry the water from the contacting surface to the collecting surface by a capillary force.

According to some embodiments, the water is carried from the contacting surface to the collecting surface through the pore by a pressure gradient.

According to some embodiments, the body has a conical shape with the first opening having a larger area than the second opening to provide the pressure gradient.

According to some embodiments, the body further comprises a fan adjacent to the first opening to provide the pressure gradient.

According to some embodiments, the contacting surface is positioned normal to a direction of the fluid flow communication through the pore.

According to some embodiments, the hydrophilic contacting surface is treated with carbon nanotubes.

According to some embodiments, the hydrophilic contacting surface is treated with graphene.

According to some embodiments, the first opening and the second opening each have circular shapes.

According to some embodiments, the collecting surface is configured such that the water exiting the pore is collected from the collecting surface by gravity, electrostatic or other external forces.

According to some embodiments, the apparatus include baffles in the inner volume of the body to direct air through the body towards the second opening.

According to some embodiments, the apparatus includes a plurality of tubes having an external hydrophilic tube surface, an internal hydrophobic tube surface and a plurality of tube pores defining an inner tube volume between the external hydrophilic tube surface and the internal hydrophobic tube surface, wherein the internal hydrophobic tube surface is in fluid flow communication with the hydrophobic collecting surface of the wall of the body.

According to some embodiments, the pores are shaped to carry the water from the contacting surface to the collecting surface by a capillary force.

According to some embodiments, the water is carried from the contacting surface to the collecting surface through the pore by a pressure gradient.

According to some embodiments, the contacting surface is positioned normal to a direction of the fluid flow communication through the pore.

According to some embodiments, the hydrophilic contacting surface is treated with carbon nanotubes.

According to some embodiments, the hydrophilic contacting surface is treated with graphene.

According to some embodiments, the collecting surface is configured such that the water exiting the pore is collected from the collecting surface by gravity.

According to some embodiments, body further includes baffles to direct the fluid flow communication from the first end of the body to the second end of the body.

According to some embodiments, the second opening and the third opening are coaxial and the first opening has an axis that is transverse to the axis of the second opening and the third opening.

According to some embodiments, the first end is an upper end, the second opening is an upper opening, the second end is lower end and the third opening is a lower opening.

According to some embodiments, the air exits through the upper opening and the water is collected at the lower opening.

According to some embodiments, the body includes an upper portion having the first opening and the second opening and a lower portion having the third opening.

According to some embodiments, the lower portion has a progressively decreasing diameter between the upper portion and the third opening.

According to some embodiments, the method also includes harvesting the water from the hydrophobic contacting surface by gravity, by applying an electric current to the hydrophobic contacting surface, or by cooling the hydrophobic contacting surface.

According to some embodiments, the contacting air with the hydrophilic contacting surface of the wall of the water harvesting apparatus includes contacting the air with a surface treated with carbon nanotubes.

According to some embodiments, the contacting air with a hydrophilic contacting surface of a wall of a water harvesting apparatus includes contacting the air with a surface treated with graphene.

According to some embodiments, the forcing passage of the water comprised within the air into the pore disposed between the hydrophilic contacting surface and the hydrophobic collecting surface includes the water being carried from the contacting surface to the collecting surface through the pore by a pressure gradient.

According to some embodiments, the forcing passage of the water comprised within the air into the pore disposed between the hydrophilic contacting surface and the hydrophobic collecting surface includes the water being carried from the contacting surface to the collecting surface through the pore by a capillary force.

According to some embodiments, during the forcing passage of the water comprised within the air into the pore disposed between the hydrophilic contacting surface and the hydrophobic collecting surface, the contacting surface is positioned normal to a direction of the fluid flow communication through the pore.

According to some embodiments, the collecting the water from the pore at the hydrophobic collecting surface includes collecting the water from the pore at the hydrophobic collecting surface by gravity, electrostatic or other external forces.

Disclosed herein are apparatuses for harvesting water form air. The apparatuses described herein include a porous wall(s) that is hydrophilic on a first side and hydrophobic on a second, opposite side. Humid air is passed along or towards the porous wall such that water vapor and/or droplets can adhere to the hydrophilic surface, seep into the pores, and be driven through the pores (e.g. naturally through capillary action) towards the hydrophobic surface. Water is expelled from the pores onto the hydrophobic surface and subsequently collected.

Referring to FIG. 1, illustrated therein is an apparatus 10 for harvesting water from air 26. The apparatus 10 includes a body 12 having a first end 11 and a second end 13 spaced apart from first end 11. First end 11 has a first opening 15 to receive air 26 (e.g. from the atmosphere). Second end 13 has a second opening 17 to release air 26 from the body 12.

Body 12 of apparatus 10 has a wall 19 extending from the first end 11 to the second end 13 to define a first volume 21 of the body 12. Wall 19 defines a first volume 21 inside of the body 12 of apparatus 10 and includes an internal hydrophilic contacting surface 14 and an external hydrophobic collecting surface 16.

As shown in FIG. 1, to maintain a pressure gradient to provide air flow through the apparatus 10 from first end 11 to second end 13, body 12 of apparatus 10 may have a conical shape (e.g. first opening 15 may have a larger area than second opening 17 and wall 19 may extend between first opening 15 and second opening 17 with a constant slope). Alternatively, body 12 can have any other appropriate shape that provides a pressure gradient through first volume 21 of body 12 to facilitate air flow through the first volume 21. In this embodiment, air from the atmosphere enters body 12 from first opening 15.

In another embodiment, the pressure gradient between the first opening 15 and the second opening 17 can be provided by a simple fan, gravity or an electrostatic field. As shown in FIG. 1, a fan 24 may be placed adjacent to first opening 15 to direct the air into first volume 21 of apparatus 10. Fan 24 may also help to augment the pressure gradient between first opening 15 and second opening 17 and facilitate air to pass from the atmosphere into first volume 21 of body 12.

As shown in FIG. 2, first opening 15 and second opening 17 may each have a circular shape or any other appropriate shape. First opening 15 and second opening 17 can have any shape to provide for air to pass from the atmosphere into first volume 21 and from first volume 21 back to the atmosphere, respectively. Further, first opening 15 and second opening 17 can have same or different shapes with respect to each other.

It should be noted that apparatus 10 can be oriented in any direction (e.g. gravity downwards, sideways, etc.)

Referring to FIG. 3, a plurality of pores 28 extend through wall 19 of body 12 of apparatus 10. The pores 28 each have a pore entrance 31 adjacent to contacting surface 14 and a pore exit 32 adjacent to collecting surface 16. Each pore 28 defines an inner volume 29 between the pore entrance 31 and the pore exit 32. Pores 28 provide for a fluid flow communication (e.g. movement of water 18 from air 26) between the pore entrance 31 and the pore exit 32 (e.g. between the contacting surface 14 and the collecting surface 16).

In one example, body 12 may be a sintered porous substrate (e.g. stainless steel, copper, etc.) meshed or honeycombed material produced by sintering, machining, 3D printing, etc. Contacting surface 14 and collecting surface 16 are hydrophilic (i.e. a contact angle between liquid water and the surface is $0°<\theta<90°$) and hydrophobic (i.e. a contact angle between liquid water and the surface is $90°<\theta<)$ $180°$, respectively. Contacting surface 14 may be treated (e.g. functionalized) to be hydrophilic and collecting surface 16 may be treated (e.g. functionalized) to be hydrophobic. For example, contacting surface 14 may be treated with a carbon-based material such as graphene or carbon nanotubes (CNT) or any other material that can be treated to be hydrophilic. Similarly, collecting surface 16 may be treated with a different carbon-based material (e.g. graphene or CNTs) or any other material that can be treated to be hydrophobic to form a hydrophobic surface. The degree of hydrophilicity of the contacting surface 14 may be altered to manage movement of the water 18 into the pores 28 through pore entrance 31 and the force exerted on the water 18 as it enters the pores 28 through pore entrance 31. Similarly, the degree of hydrophobicity of the collecting surface 16 may be altered to manage movement of the water as it exits the pores 28 at pore exit 32 and the force that the collecting surface 16 exerts on the water 18 as the water 18 exits pore exit 32. Further, the size (e.g. the width W and length L) of pores 28 can be configured to facilitate passage of water 18 between the pore entrance 31 and the pore exit 32 (e.g. between the contacting surface 14 and the collecting surface 16) under different environmental conditions. For example, the width of pores 28 can be in a range from a few microns to tens of micrometers. The diameter of the pores may be in a range of about 5 microns to about 50 microns. The length of the pores is in a range of about 10 microns to about 50 microns. The porosity of the material can vary between about 30-45%. In some embodiments, a contact angle between liquid water and the contacting surface 14 can be about 0° and a contact angle between liquid water and the collecting surface 16 can be about 180°.

In operation, atmospheric humid air 26 can be forced into first volume 21 of apparatus 10 through first opening 15 such that water 18 can be adsorbed onto the contacting surface 14 as it travels along contacting surface 14 in a direction towards second opening 17. Referring to FIG. 3, illustrated therein is a magnified view 22 of the body 12 of apparatus 10. As water 18 is adsorbed onto the contacting surface 14 that is treated by adding, for example, a carbon-based layer (e.g. graphene or carbon nanotubes (CNTs)), a thin film of liquid water 18 forms on the contacting surface 14. Liquid water flows along contacting surface 14 in a direction towards second opening 17 due to the pressure gradient and/or wettability between the first opening 15 and the second opening 17 of the wall 19. Water 18 enters pores 28 at pore entrance 31 and flows along length L of the pores 28 by capillarity until the water reaches pore exit 32. An Inner wall 19 of pores 28 may be untreated or may be treated to facilitate movement of water travelling between contacting surface 14 and collecting surface 16.

At pore exit 32, a droplet 20 begins to form as the hydrophobicity of collecting surface 16 resists movement of the water 18 along the collecting surface 16 as the water exits pore 28. In one embodiment, as water 18 continues to enter pore 28 due to the aforementioned pressure gradient and pass through pore 28 due to the aforementioned capillarity, water 18 creates a droplet 20 so large that the force exerted by the combination of capillary force and an applied pressure differential on the droplet overcomes the resistive force exerted by hydrophobic collecting surface 16 and the droplet 20 detaches from the pore exit 32. As noted above, the pressure gradient forces on water 18 may be imposed by a shape of body 12 of apparatus 10 (e.g. a conical shape) or by the presence of fan 24.

After detachment of droplet 20 from pore exit 32, droplet 20 generally collects on collecting surface 16 and travels along collecting surface 16 to be accumulated with other droplets. In one embodiment, an electrostatic current or cooling can be applied to the collecting surface 16 to facilitate detachment of droplets 20 from the collecting surface 16. Several factors can affect how droplet 20 detaches from collecting surface 16. For example, droplet 20 may detach from collecting surface 16 when the surface energy of droplet 20 is similar to the surface tension energy of droplet 29. In one embodiment, droplets 20 travelling along collecting surface 16 converge through ribs and/or guide vanes and coalesce into rivulets of water. These rivulets may be amassed by converging collectors and recipients' within or external to apparatus 10.

In some embodiments, water collected by apparatus 10 can be treated for use as drinking water. For example, collected water may be passed through any one or more of a variety of treatment options to meet drinking water quality standards. These treatments may include UV irradiation, mineralization and/or filtering. A storage unit (not shown) may be attached to apparatus 10 to collect the water once it has detached from the collecting surface 16. This unit may vary in size with respect to the production capacity of apparatus 10.

In one embodiment, water vapor may enter into pores 28 and condense through capillary condensation, a process by which the narrow space (e.g. as represented by width W) of pores 28 induces condensation of water vapor. Condensation occurs when a multi-layer adsorption of water vapor accumulates onto the pores 28 and condenses. This phenomenon allows water vapor to condense below its saturation vapor pressure (Charlaix & Ciccoti, 2009). It is likely that during this condensation process, energy released during the condensation phase of water vapor is thermal. Hence, this energy release can alter the surface temperature of pores 28. Therefore, in one embodiment, apparatus 10 may include a low-power cooling device (not shown; e.g. a Peltier, a heat pump, a heat pipe, etc.) to maintain a slight temperature difference between pores 28 and the incoming air. Condensation may be significantly aided by surface modifications and, therefore, only supplemental amounts of cooling may be necessary, contrarily to current AWG devices that rely solely on cooling.

Apparatus 10 may further include a filter (not shown). Water collected using apparatus 10 may include particulate matter (PM), which is the element that serves as a nucleus for water vapor condensation into a micro droplet. Particulate matter in the water may include many different types of material including dust, silicon oxide (sand), iron and other metallic particles and possibly even organic compounds in certain area of the world. When water is extracted from the atmosphere using apparatus 10, it may be necessary to separate PM therein from the water. This could be done using a filter (not shown). Furthermore, in cases where algae or fungi may be present in the air, an ultraviolet diode light (not shown) or similar mechanism for disinfection of the water may also be included.

It is possible to consider enhancing the flow of liquid with an electro static charge if need be. This technique can also be used to accelerate the flow through capillary tracks within the separator surface.

FIG. 4 is an end view of a different embodiment for harvesting water from air. As shown in FIG. 5, in this embodiment, the apparatus 100 includes a body 112 having a first end 111 and a second end 113 spaced apart from first end 111. First end 111 has a first opening 115 to receive air 126 from atmosphere. Second end 113 has a second opening 117 to release air 126 from the body 112. Body 112 also includes an interior surface 114 and an exterior surface 116, each extending between first opening 115 to second opening 117.

Apparatus 100 includes tubes that pass through body 112 having a volume 121. In the embodiment shown in FIGS. 4 and 5, tubes 110 are positioned along an axis normal to a direction of flow of air 126 passing through apparatus 100 and are spaced throughout the volume 121 to augment contact surface between moist air 126 and the tubes 110. The positioning of tubes 110 may be aligned or staggered within volume 121.

Tubes 110 are similar in configuration to the wall 19 of apparatus 10 that was previously described above with reference to FIGS. 1 to 3. Specifically, tubes 110 have pores (not shown) that extend between a hydrophilic contacting surface 125 exposed to the air 126 passing through body 112 of apparatus 100, and a hydrophobic collecting surface 127 (e.g. an inner wall of tubes). Contacting surface 125 may be treated to be hydrophilic and collecting surface 127 may be treated to be hydrophobic. As was previously described, as water flows into the tubes 110 from air 126 due to a pressure gradient between first opening 115 and second opening 117, droplets contact contacting surface 125 and enter pores. Water passes through the pores towards the collecting surface 126 of the device 100 due to a combination of the pressure gradient forces previously mentioned and capillarity provided by the pores. Optionally, water can be treated after being collected in this manner.

It should be noted that although FIG. 5 shows the apparatus 100 in a sideways configuration, the inflow of humid air 126 into body 112 of apparatus 100 may come from any direction (e.g. with gravity (fan-side above), against gravity (fan-side under) or any other possible direction).

Figure 6:
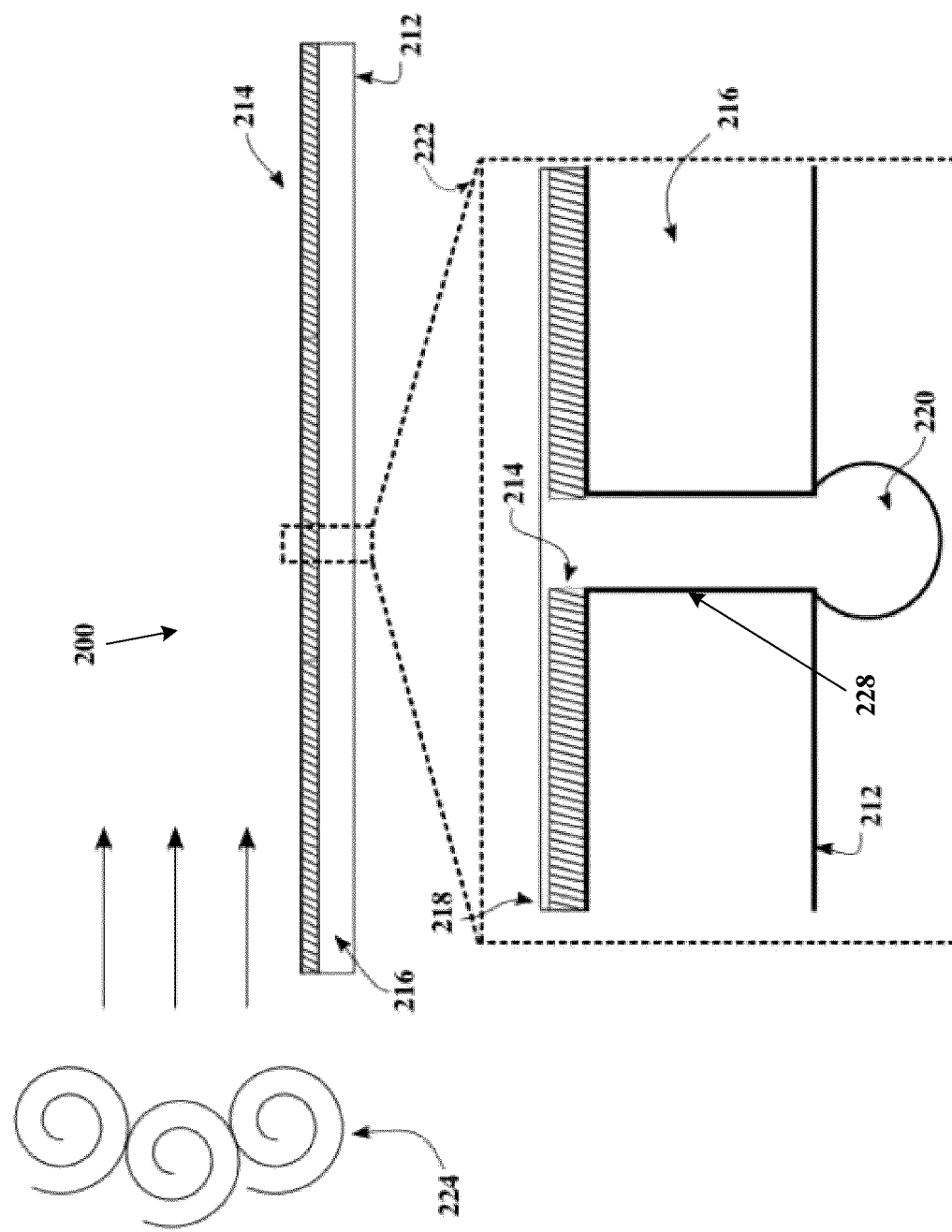
FIG. 6 is a side view and a magnified side view of a portion of a water harvesting device, according to another embodiment.

Referring to FIG. 6, illustrated therein is another embodiment of an apparatus 200 for harvesting water. In this embodiment, a stream of air 224 is forced over a membrane 216 having a contacting surface 214 on which water is adsorbed. As was previously described with reference to wall 19 of FIGS. 1 to 3, contacting surface 214 is hydrophilic (e.g. by being treated with a carbon-based treatment such as but not limited to graphene or CNT). Membrane 216 also has a hydrophobic collecting surface 212 that may be treated to be hydrophobic. Pores 228 extend between the hydrophilic contacting surface 214 and the hydrophobic collecting surface 212 to allow a fluid flow communication (e.g. movement of water) between the contacting surface 214 and the collecting surface 212. In operation, as air passes over contacting surface 214, water adsorbs onto contacting surface 214 and passes through pores 228 of membrane 216 from contacting surface 214 to collecting surface 212, where water is ejected from the pores 228. In this embodiment, the stream of air 224 passes horizontally over (e.g. parallel to) the contacting surface 214 of apparatus 200.

Figure 7:
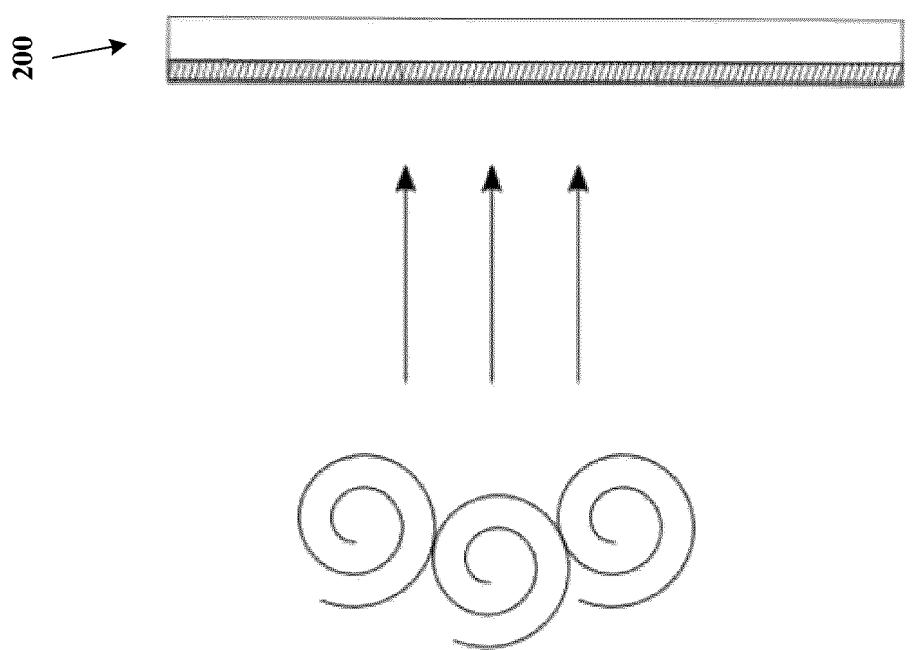
FIG. 7 is a side view of the water harvesting device of FIG. 6 in a second configuration.

Referring to FIG. 7, illustrated therein is apparatus 200 of FIG. 6 in a second configuration where the air 224 is forced towards the apparatus 200 in a direction normal to membrane 216 (e.g. air 224 hits contacting surface 214 of membrane 216 perpendicularly). In some embodiments, this configuration may enhance the amount of contact between the air 224 and the contacting surface 216.

Figure 8:
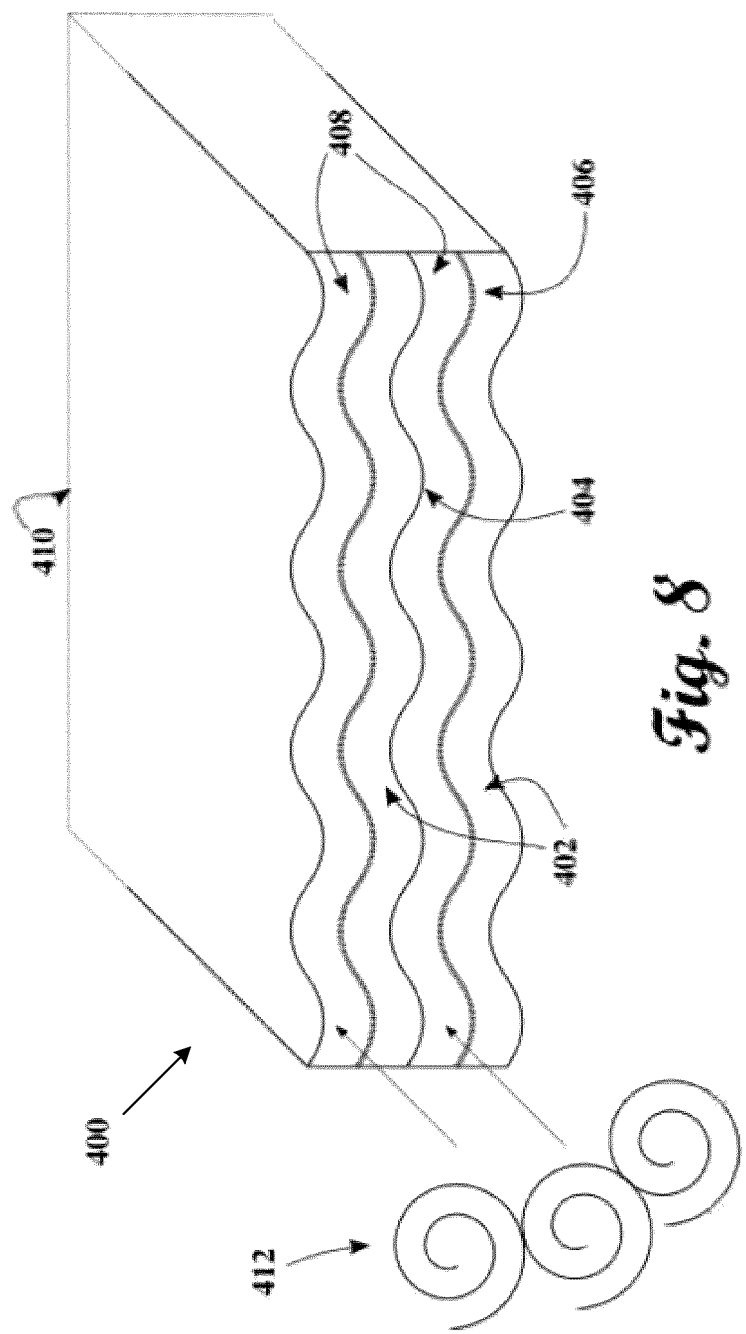
FIG. 8 is a cross-section view of a water harvesting device, according to another embodiment.

Referring to FIG. 8, illustrated therein is another embodiment of an apparatus 400 for harvesting water from air. In this embodiment, the air 412 passes into the apparatus 400 via first opening 415 at a first end 411 (see FIG. 9). Apparatus 400 includes a plurality of alternating corrugated surfaces, first surfaces 404 and second surfaces 406.

In this embodiment, second surfaces 406 are a hydrophilic-hydrophobic material such as was described with reference to wall 19 of FIGS. 1 to 3. First surfaces 404 may be an untreated material or may be treated to aid the water nucleation on the second surfaces 406. This may be done by treating the lower side of the surface 404, facing the hydrophilic surface 406, to be hydrophobic and exert repulsive forces on water molecules, pushing them towards the hydrophilic surface 406. The space in between surfaces 404 and 406 alternate between water harvesting areas 408 and water collection areas 402. The distance between each plate may be diminished in the direction of air flow as air 412 flows through the device to maintain a pressure gradient and/or the air flow rate.

Figure 9:
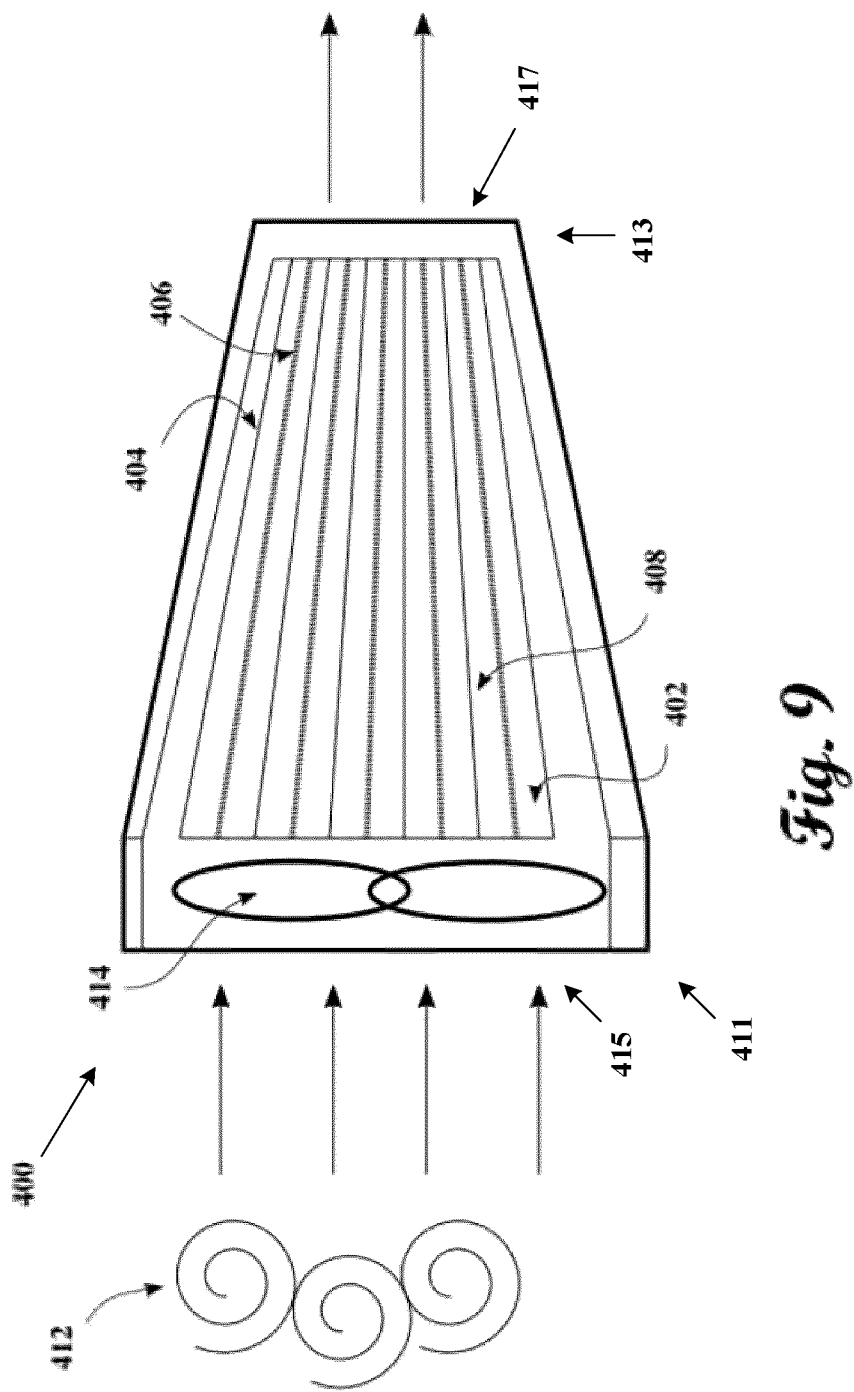
FIG. 9 is a top view of the water harvesting device of FIG. 8.

FIG. 9 is a cross-sectional view of the embodiment 400. In this figure, the decrease in the space between the plates can be noticed.

Figure 10:
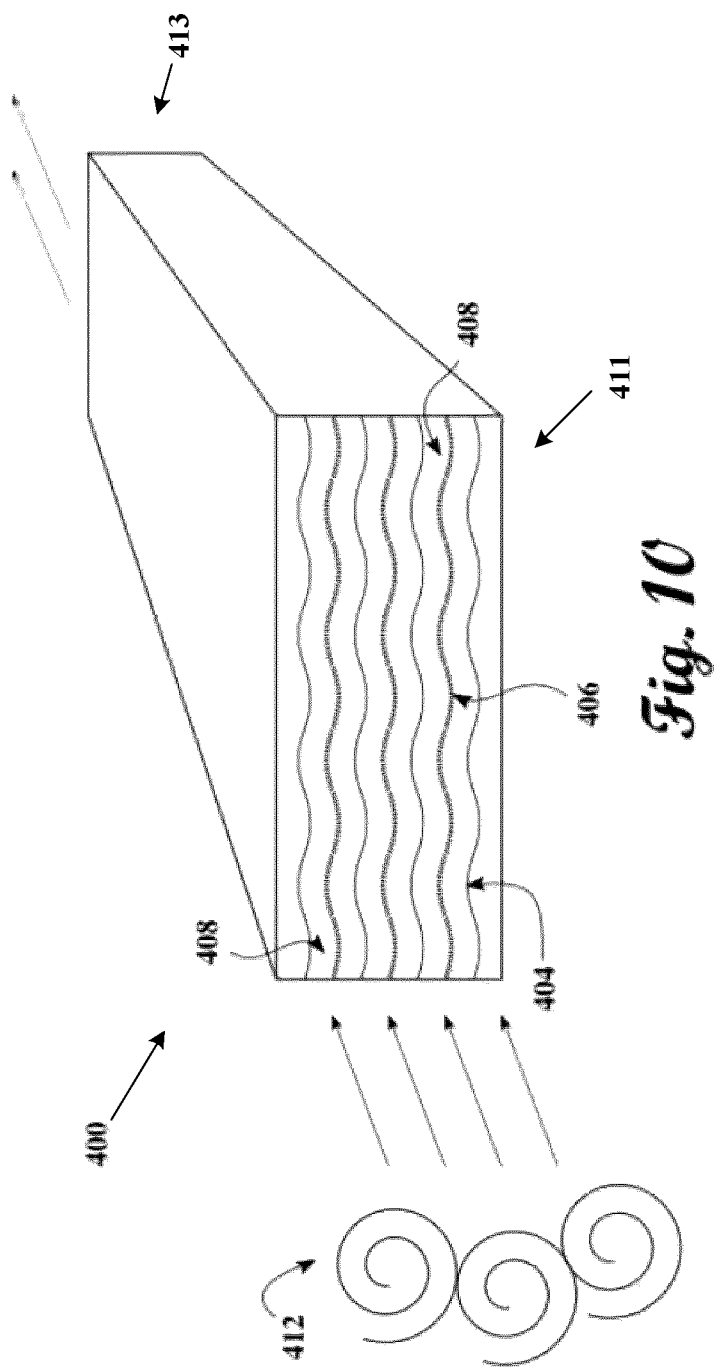
FIG. 10 is a perspective view of the water harvesting device of FIG. 8.

FIG. 10 is a front view of the device 400 where fan 414 is not shown. The same principle of water collection that has been explained previously is applied throughout this embodiment.

Figure 11:
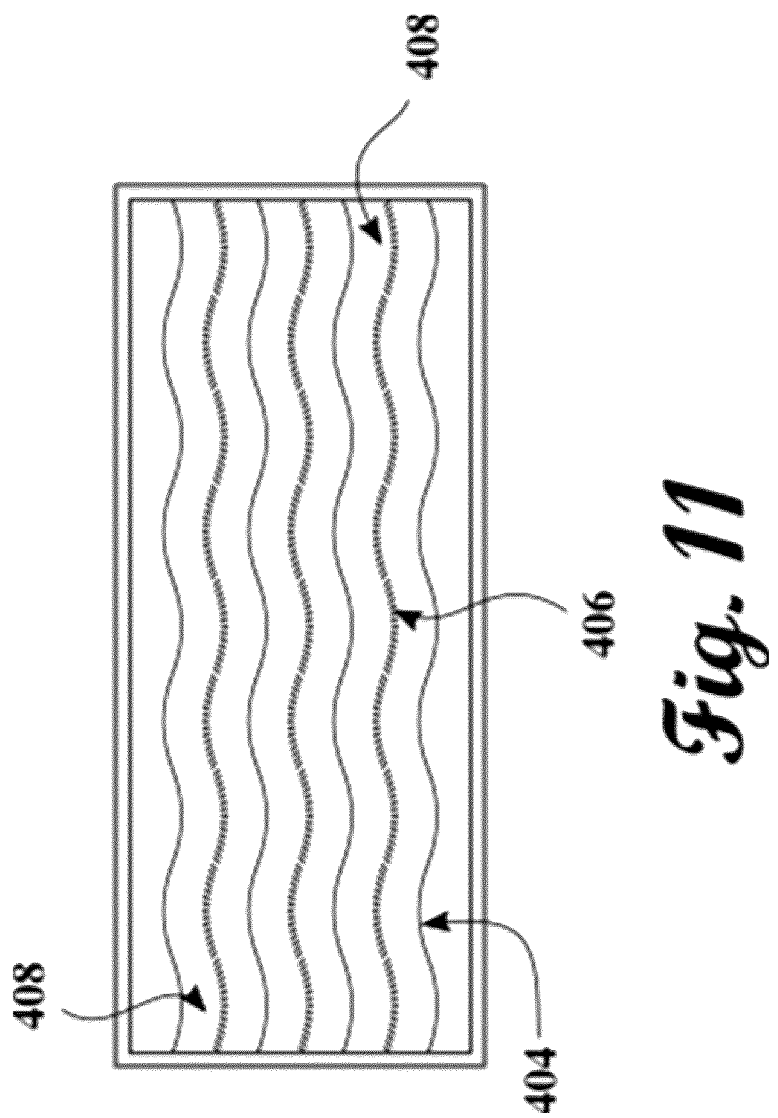
FIG. 11 is a front view of the water harvesting device of FIG. 8.

FIG. 11 is a front view of the device 400 where fan 414 is not shown. The same principle of water collection that has been explained previously is applied throughout this embodiment.

Figure 12:
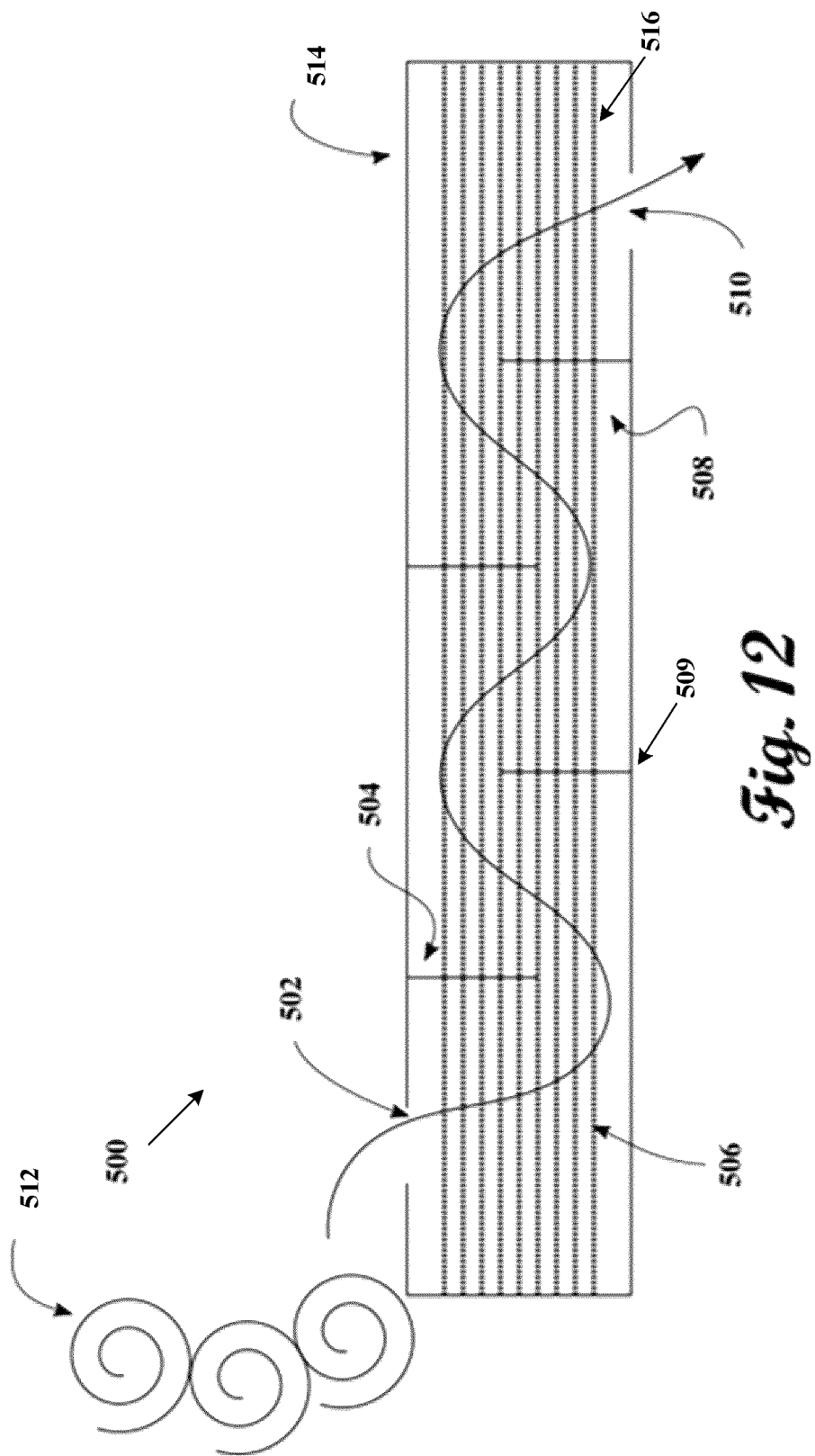
FIG. 12 is a side view of a water harvesting device, according to another embodiment.

FIG. 12 is another embodiment of an apparatus for harvesting water from air. In this embodiment, apparatus 500 includes the same hydrophilic-hydrophobic water transfer mechanism as was described with reference to FIGS. 1 to 3 (e.g. movement of water through pores 28 of wall 19). In apparatus 500, a tube bank 506 is positioned to be transverse to a direction of travel of humid air 512. Humid air 512 is forced into the apparatus 500 through inlet 502 and directly contacts tube bank 506. Water vapor and droplets are adsorbed on the outer surface (e.g. hydrophilic contacting surface) of each tube of tube bank 506 and seeps into an inner volume of each tube through pores (as previously described) where the water can be collected off of a collecting surface and (optionally) treated. Air flow 512 passes through a shell-side 514 of the apparatus 500 and water is collected on the tube-side 516 (e.g. in the inner volume of the tubes). Baffles 504 can be added to apparatus 500 to increase air 512 contact with the tubes 506 and to direct the air flow 512 towards the outlet 510. In the embodiment shown in FIG. 12, baffles 504 extend from an inner wall 509 of apparatus 500 into an inner volume 508 of apparatus 500.

Figure 13:
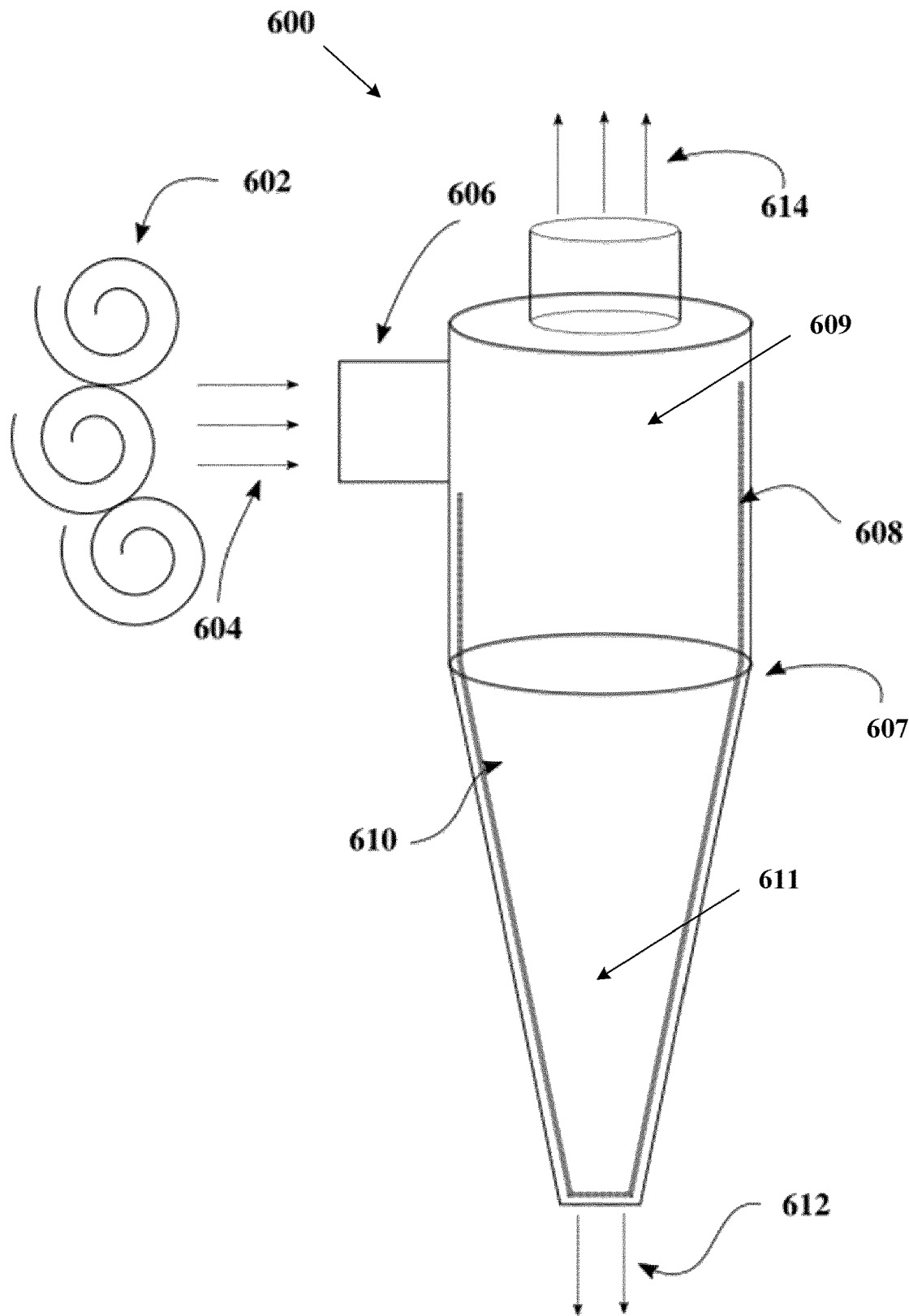
FIG. 13 is a perspective view of a water harvesting device, according to another embodiment.

FIG. 13 shows a perspective view of another embodiment of an apparatus for harvesting water from air. In this embodiment, apparatus 600 includes the same hydrophilic-hydrophobic water transfer mechanism as described previously with reference to FIGS. 1 to 3 (e.g. movement of water through pores 28 of wall 19). In apparatus 600, moist air 602 is directed through apparatus inlet (e.g. opening) 606 and into body 607 where is comes into contact with the modified surface 608 (e.g. with a functionalized nanotextile) lining an interior surface of the body 607. Body 607 has a generally conical shape including an upper portion 609 and a lower portion 611. In FIG. 13, upper portion 609 is shown as having a constant diameter along its length and lower portion 611 is shown as having a progressively decreasing diameter along its length as it extends from the upper portion 609 towards lower outlet (e.g. opening) 612. In other embodiments, body 607 has a progressively decreasing diameter along its entire length. It should also be understood that both upper portion 609 and lower portion 611 may also have progressively decreasing diameters along their length, where the rate of decrease of the upper portion varies from the rate of decrease of the lower portion.

Moist air 602 enters the body 607 via inlet 606 and is dehumidified as it travels in a downward spiral within body 607 from the inlet 606 towards a bottom of the device 600. At least a portion of the cross-sectional area of the body 607 progressively reduces as the moist air travels towards the bottom of the device 600. Modified surface 608 is treated with a nanostructure (e.g. functionalized nanotextile) along the inner wall of the apparatus 600 to separate the water from the moist air. Water is collected at the lower outlet 612 of the device 600 (e.g. by gravity) and dry air exits through the top outlet 614 (e.g. opening).

In some embodiments, the upper outlet 612 and the lower outlet 614 are coaxial along an axis such as but not limited to an axis along a length of the body 607. The inlet 606 may have an axis that is transverse to one or both of the axis of upper outlet 612 and lower outlets 614.

Figure 14:
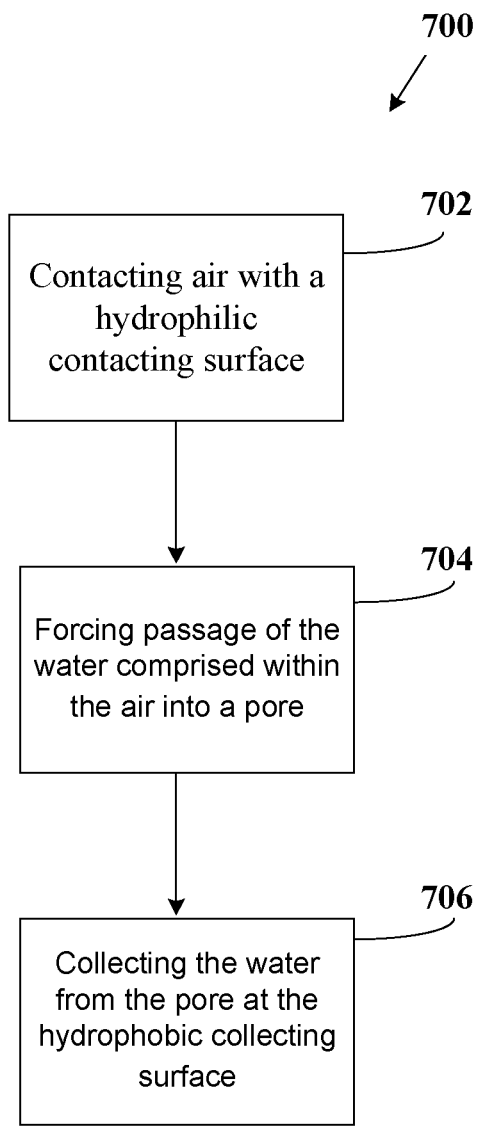
FIG. 14 is a block diagram of a method of contacting air with a hydrophilic contacting surface of a wall of a water harvesting apparatus.

Referring now to FIG. 14, shown therein is a block diagram of a method 700 of harvesting water from air.

The method 700 includes a step 702 of contacting air with a hydrophilic contacting surface of a wall of a water harvesting apparatus. Step 704 includes forcing passage of the water comprised within the air into a pore disposed between the hydrophilic contacting surface and a hydrophobic collecting surface. Step 706 includes collecting the water from the pore at the hydrophobic collecting surface.

The embodiments of paragraphs of the present disclosure are presented in such a manner in the present disclosure so as to demonstrate that every combination of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combinations, when applicable, between the embodiments of any paragraphs and the apparatuses, devices, methods and processes of the Summary are hereby covered by the present disclosure.

While the above description provides examples of one or more apparatus, it will be appreciated that other apparatus may be within the scope of the claims as interpreted by one of skill in the art.

REFERENCES

Charlaix, E., & Ciccoti, M. (2009). *Capillary Condensation in Confined Media*. HAL.

Coulombe, S., Meunier, J.-L., Hordy, N., Jorge, L., Vandsburger, L., & Roche, P. (2014). United States of America Patent No. WO/2014/139028.

Frankel, T. (2015, Jun. 18). World's Water Woes Accelerate. *National Post, p. A*14.

Greenlee, L. F., Lawler, D. F., Freeman, B. D., Marrot, B., & Moulin, P. (2009). *Reverse Osmosis Desalination: Water Sources, Technology and today<s challenges*. Elsevier.

Harbec, D., & Meunier, J.-L. (2010). U.S. Pat. No. 7,846, 414 82.

Johnson, D. (Jun. 4, 2015). *Graphene Coating Could Save Millions in Power Plant Energy Costs*. Retrieved from IEEE Spectrum: http://spectrum.ieee.org/nanoclast/energy/fossil-fuels/graphene-coating-could-save-millions-in-power-plant-energy-costs McClearn, M. (Feb. 21, 2017). Unsafe to drink. Retrieved from The Globe and Mail: https://www.theglobeandmail.com/news/water-treatment-plants-fail-on-reserves-across-canada-globe-reviewfinds/article34094364/Meunier, Meunier, J.-L., Berk, D., Vasilica, P., Binny, D., Mendoza Gonzales, N.-Y., & Pascone, P.-A. (2014). United States of America Patent No. PCT/CA2013/050503.

Peters, G. M., Blackburn, N. J., & Armedion, M. (2013). *Environmental assessment of air to water machines—triangulation to manage scope uncertainties*. Springer.

Safford, M. (2007, May 7). Water Cycle and Climate Change. *Futurist: Environment &Energy*.

Thiel, G. P. (June 2015). Salty Solutions. *Physics Today*, 66-67.

Warren, J. (Sep. 24, 2016). *Fresh water scarcity is an issue in Canada too*. Retrieved from Toronto Sun: http://www.torontosun.com/2016/09/24/fresh-water-scarcity-is-an-issue-in-canada-too

What is claimed is:

1. An apparatus for harvesting water from air, the apparatus comprising:
   a body comprising:
   a first end and a second end, the first end spaced apart from the second end, the first end having a first opening to receive air from atmosphere, or another fluid, comprising water and the second end having a second opening to release air from the body; and
   a wall of the body extending from the first end to the second end and comprising an internal hydrophilic contacting surface and an external hydrophobic collecting surface, the wall comprising a plurality of pores defining an inner volume between the contacting surface and the collecting surface and allowing a fluid flow communication between the contacting surface and the collecting surface,
   wherein the water is carried from the contacting surface to the collecting surface through the pore by a pressure gradient,
   and wherein the body has a conical shape with the first opening having a larger area than the second opening to provide the pressure gradient.

2. The apparatus of claim 1, wherein the pores are shaped to carry the water from the contacting surface to the collecting surface by a capillary force.

3. The apparatus of claim 1, wherein the body further comprises a fan adjacent to the first opening to provide the pressure gradient.

4. The apparatus of claim 1, wherein the contacting surface is positioned normal to a direction of the fluid flow communication through the pore.

5. The apparatus of claim 1, wherein the hydrophilic contacting surface is treated with carbon nanotubes.

6. The apparatus of claim 1, wherein the hydrophilic contacting surface is treated with graphene.

7. The apparatus of claim 1, wherein the first opening and the second opening each have circular shapes.

8. The apparatus of claim 1, wherein the collecting surface is configured such that the water exiting the pore is collected from the collecting surface by gravity, electrostatic or other external forces.

9. The apparatus of claim 1, further comprising baffles in the inner volume of the body to direct air through the body towards the second opening.

10. The apparatus of claim 1, further comprising a plurality of tubes having an external hydrophilic tube surface, an internal hydrophobic tube surface and a plurality of tube pores defining an inner tube volume between the external hydrophilic tube surface and the internal hydrophobic tube surface, wherein the internal hydrophobic tube surface is in fluid flow communication with the hydrophobic collecting surface of the wall of the body.

11. An apparatus for harvesting water from air, the apparatus comprising:
    a body comprising:
    a first end and a second end, the first end spaced apart from the second end, the first end having a first opening to receive air from atmosphere, or another fluid, comprising water and a second opening to release the air from the body, the second end having a third opening to release the water from the body; and
    a wall of the body extending between the first end and the second end and comprising an internal hydrophilic contacting surface and an external hydrophobic collecting surface, the wall comprising a plurality of pores defining an inner volume between the contacting surface and the collecting surface and allowing a fluid flow communication between the contacting surface and the collecting surface.

12. The apparatus of claim 11, wherein the second opening and the third opening are coaxial and the first opening has an axis that is transverse to the axis of the second opening and the third opening.

13. The apparatus of claim 11, wherein the first end is an upper end, the second opening is an upper opening, the second end is a lower end and the third opening is a lower opening.

14. The apparatus claim 13, wherein the air exits through the upper opening and the water is collected at the lower opening.

15. The apparatus of claim 11, wherein the body includes an upper portion having the first opening and the second opening and a lower portion having the third opening.

16. An apparatus for harvesting water from air, the apparatus comprising:
a body comprising:
a first end and a second end, the first end spaced apart from the second end, the first end having a first opening to receive air from atmosphere, or another fluid, comprising water and the second end having a second opening to release air from the body; and
a wall of the body extending from the first end to the second end and comprising an internal hydrophilic contacting surface and an external hydrophobic collecting surface, the wall comprising a plurality of pores defining an inner volume between the contacting surface and the collecting surface and allowing a fluid flow communication between the contacting surface and the collecting surface,
wherein the hydrophilic contacting surface is treated with carbon nanotubes.

17. An apparatus for harvesting water from air, the apparatus comprising:
a body comprising:
a first end and a second end, the first end spaced apart from the second end, the first end having a first opening to receive air from atmosphere, or another fluid, comprising water and the second end having a second opening to release air from the body; and
a wall of the body extending from the first end to the second end and comprising an internal hydrophilic contacting surface and an external hydrophobic collecting surface, the wall comprising a plurality of pores defining an inner volume between the contacting surface and the collecting surface and allowing a fluid flow communication between the contacting surface and the collecting surface,
wherein the hydrophilic contacting surface is treated with graphene.

18. An apparatus for harvesting water from air, the apparatus comprising:
a body comprising:
a first end and a second end, the first end spaced apart from the second end, the first end having a first opening to receive air from atmosphere, or another fluid, comprising water and the second end having a second opening to release air from the body;
a wall of the body extending from the first end to the second end and comprising an internal hydrophilic contacting surface and an external hydrophobic collecting surface, the wall comprising a plurality of pores defining an inner volume between the contacting surface and the collecting surface and allowing a fluid flow communication between the contacting surface and the collecting surface; and
a plurality of tubes having an external hydrophilic tube surface, an internal hydrophobic tube surface and a plurality of tube pores defining an inner tube volume between the external hydrophilic tube surface and the internal hydrophobic tube surface, wherein the internal hydrophobic tube surface is in fluid flow communication with the hydrophobic collecting surface of the wall of the body.

* * * * *